No. 727,393. PATENTED MAY 5, 1903.
W. A. LEWIS.
NUT LOCK.
APPLICATION FILED JAN. 28, 1903.
NO MODEL.

WITNESSES:
John Oller
G. B. Howse

INVENTOR.
Walter A. Lewis
BY
Geo. H. Strong
ATTORNEY.

No. 727,393. Patented May 5, 1903.

UNITED STATES PATENT OFFICE.

WALTER A. LEWIS, OF BATTLE MOUNTAIN, NEVADA, ASSIGNOR OF TWO-THIRDS TO ROBERT M. HORTON AND JOHN DIMOND, OF BATTLE MOUNTAIN, NEVADA.

NUT-LOCK.

SPECIFICATION forming part of Letters Patent No. 727,393, dated May 5, 1903.

Application filed January 28, 1903. Serial No. 140,873. (No model.)

*To all whom it may concern:*

Be it known that I, WALTER A. LEWIS, a citizen of the United States, residing at Battle Mountain, county of Lander, State of Nevada, have invented an Improvement in Nut-Locks; and I hereby declare the following to be a full, clear, and exact description of the same.

My invention relates to improvements in means for preventing nuts from loosening on bolts. Its object is to provide a simple effective nut-locking device for use in bridge-building, railway construction, and wherever there is a tendency for nuts to jar loose.

It consists of the parts and the construction and combination of parts, as hereinafter more fully explained, having reference to the accompanying drawings, in which—

Figure 1:
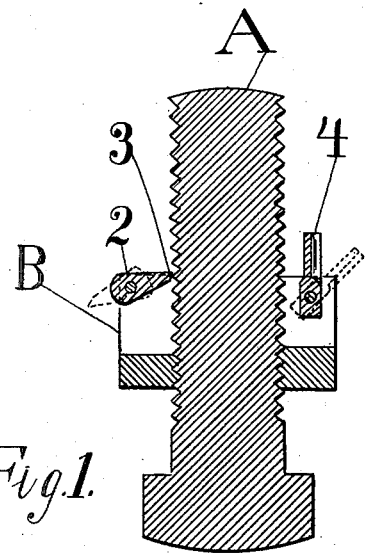
Figure 2:
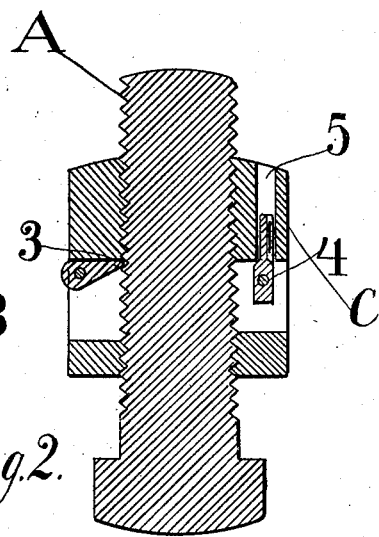
Figure 3:
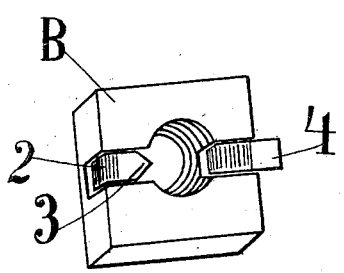
Figure 4:
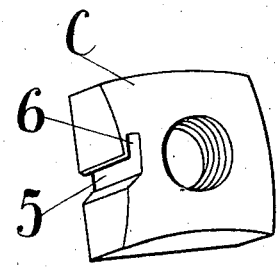

Figure 1 is a sectional view of the nut with its locking devices. Fig. 2 is a sectional view of the bolt with both nuts in engagement. Fig. 3 is a perspective view of the lower nut. Fig. 4 is a perspective view of the upper nut.

A represents an ordinary bolt provided with the two nuts B and C. The inner nut B has a radial slot in which a wedge 2 is pivoted. This wedge is so pivoted in the slot and its shape is such that when it is turned to bring the point portion 3 against the threads of the bolt and the outer set-nut C is screwed against B the point of the wedge will be forced into the bolt-threads to lock the inner nut against turning. The outer nut is then locked in position upon B by means of a pivoted latch member 4 on the latter engaging in a longitudinal notch 5 on the periphery of nut C. This notch is formed so that the bottom of it extends as an undercut in the direction of the threads of the nut, whereby a portion 6 of the latter serves as a keeper for the latch 4 after the latch has been engaged and the nut turned slightly as to unscrew it. The relative locations of the latch and notch on their several nuts are such that when the outer nut C is screwed down flush upon nut B the opening of the notch will coincide with the latch to allow the latter to be turned up into engagement therewith.

In operation the nut B is screwed onto the bolt, the construction of the wedge being such that when it is turned to throw the point outward it will not interfere with the screwing on or off of the nut. The wedge is then turned to bring the point or knife-edge of the wedge against the threads of the bolt, leaving a portion of the wedge intermediate of the point and the fulcrum extending a trifle above the surface of the nut. The outer nut C is next screwed down upon B until the adjacent surfaces of the nuts are in intimate contact, thereby pressing down on the wedge and causing the point to dent in the threads of the bolt. The latch is then engaged in notch 5, as previously described. Thus the inner nut is locked by means of the outer nut and wedge, and the outer nut is locked by means of the latch carried by the inner nut. It is to be noted that advantage is taken of the tendency of the outer nut to loosen. To remove the nuts, the outer one is first tightened to bring the notch-opening in position to allow the latch to be freed of the keeper 6. When the outer nut has been taken off, the wedge may be easily turned to permit the inner nut being unscrewed. The same bolts and nuts may be used repeatedly.

Having thus described my invention, what I claim, and desire to secure by Letters Patent, is—

1. A nut-locking device consisting in combination of a bolt, inner and outer nuts screwing thereon, a wedge carried by the inner nut and adapted to engage the threads of the bolt when the outer nut is screwed on and means for locking the two nuts together.

2. A nut-lock consisting in combination, of a bolt, inner and outer nuts screwing thereon, a wedge pivoted on one of said nuts and engaging the bolt by contact with the other nut, and means carried by one nut engaging the other nut to lock the two together.

3. The combination in a nut-lock, of a bolt, a nut screwing thereon and having a radial slot, a wedge pivoted in said slot and adapted to be turned so that it engages the threads of the bolt, a latch carried by said nut, and a second nut screwing onto the bolt and adapted to engage said wedge, and having a notch in which said latch may be engaged.

4. The combination in a nut-lock, of a bolt, a nut screwing thereon, a wedge pivoted in said nut and adapted to be turned to engage the threads of the bolt, a second nut screwing on the bolt and engaging said wedge and having a notch undercut in the direction of the threads of said nut, and latch means carried by the first-named nut engaging said notch.

In witness whereof I have hereunto set my hand.

WALTER A. LEWIS.

Witnesses:
JAMES B. HORTON,
HENRY S. STARRETT.